(12) United States Patent
Wang et al.

(10) Patent No.: US 6,992,653 B2
(45) Date of Patent: Jan. 31, 2006

(54) POINTING DEVICE WITH A ROLLABLE DEVICE AND LIGHT SOURCE

(75) Inventors: Jong-Ding Wang, Taipei (TW);
Kai-Kuang Liang, Taipei (TW);
Cheng-Pin Chou, Taipei Hsien (TW);
Chen-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 675 days.

(21) Appl. No.: 09/681,855

(22) Filed: Jun. 19, 2001

(65) Prior Publication Data

US 2002/0018045 A1 Feb. 14, 2002

(30) Foreign Application Priority Data

Aug. 4, 2000 (TW) ................ 89115674 A

(51) Int. Cl.
  *G09G 5/00* (2006.01)
(52) U.S. Cl. ............ 345/156; 345/157; 345/166; 345/167; 345/184
(58) Field of Classification Search ........ 345/156–158, 345/161, 163, 166–167, 170, 786, 184
See application file for complete search history.

(56) References Cited

U.S. PATENT DOCUMENTS

| | | | | |
|---|---|---|---|---|
| 5,699,083 A | * | 12/1997 | Lo ........................ | 345/156 |
| 5,712,725 A | * | 1/1998 | Faltermeier et al. ....... | 359/392 |
| 5,717,427 A | * | 2/1998 | Lin ........................ | 345/163 |
| 5,903,267 A | * | 5/1999 | Fisher .................... | 345/341 |
| 6,014,140 A | * | 1/2000 | Strand .................... | 345/341 |
| 6,157,369 A | * | 12/2000 | Merminod et al. ........ | 345/157 |
| 6,271,838 B1 | * | 8/2001 | Gentner et al. .......... | 345/342 |
| 6,856,326 B1 | * | 2/2005 | Zhai ....................... | 345/684 |
| 6,865,718 B2 | * | 3/2005 | Levi Montalcini ....... | 715/786 |

FOREIGN PATENT DOCUMENTS

| | | |
|---|---|---|
| CN | 1157435 A | 8/1997 |
| CN | 1160244 A | 9/1997 |
| CN | 2377611 Y | 5/2000 |
| JP | 11122294 A | 4/1999 |

* cited by examiner

Primary Examiner—Alexander Eisen
Assistant Examiner—Kimnhung Nguyen
(74) Attorney, Agent, or Firm—Winston Hsu

(57) ABSTRACT

A pointing device is electrically connect to a computer. The pointing device is used to control movements of a cursor on a display device of the computer. The pointing device has a housing, a pointing unit installed inside the housing to generate pointing signals to control the movements of the cursor, a rollable device for generating rolling signals, a light source for illuminating the rollable device, and a control unit for controlling the pointing device. When the computer transmits a state signal to the pointing device, the control unit controls the light source to determine an illumination mode of the rollable device according to the state signal.

21 Claims, 7 Drawing Sheets

POINTING DEVICE WITH A ROLLABLE DEVICE AND LIGHT SOURCE

BACKGROUND OF INVENTION

1. Field of Invention

The present invention relates to a pointing device and, in particular, to a pointing device with an illuminated rollable device that indicates a computer state by using an illumination mode of its rollable device.

2. Description of the Prior Art

Conventional pointing devices with rollable devices can only generate pointing signals that are sent to a computer for controlling cursor displacement, or for scrolling windows on a display. The prior art pointing device cannot, however, receive and display messages sent from the computer. A user is thus incapable of learning the state of the computer from the conventional pointing device. For example, when the computer receives an e-mail message from a network and the display is not on, or the user is not looking at the monitor, the user cannot immediately know that there is an e-mail message and may consequently miss an important timed message. When the computer is in a specific operational mode, such as when a computer window has a scrolling navigation function, and the user does not scroll the window, the user will not be able to know that the window has the scrolling navigation function.

SUMMARY OF INVENTION

It is therefore a primary objective of the present invention to provide a pointing device that can display messages sent from a computer so that a user may directly know the computer state from the lighting mode of a rollable device on the pointing device.

The present invention, briefly summarized, uses a pointing device and a computer. The pointing device is electrically connected to the computer to control movements of a cursor on a display device of the computer. The pointing device has a housing, a pointing unit installed inside the housing to generate pointing signals to control the movements of the cursor, a rollable device for generating rolling signals, a light source for illuminating the rollable device, and a control unit for controlling the pointing device. When the computer transmits a state signal to the pointing device, the control unit controls the light source to determine an illumination mode of the rollable device according to the state signal.

It is an advantage of the present invention that the light source illuminates the rollable device according to an illumination mode as dictated by the state signal received from the computer. Hence, depending on the state signal received, a different illumination mode will be used to illuminate the rollable device. A user may thus know a state of the computer simply by viewing the rollable device.

These and other objectives and advantages will no doubt become clear to those of ordinary skill in the art after reading the following detailed description of the preferred embodiment, which is illustrated in the various figures and drawings.

DETAILED DESCRIPTION

Figure 1:
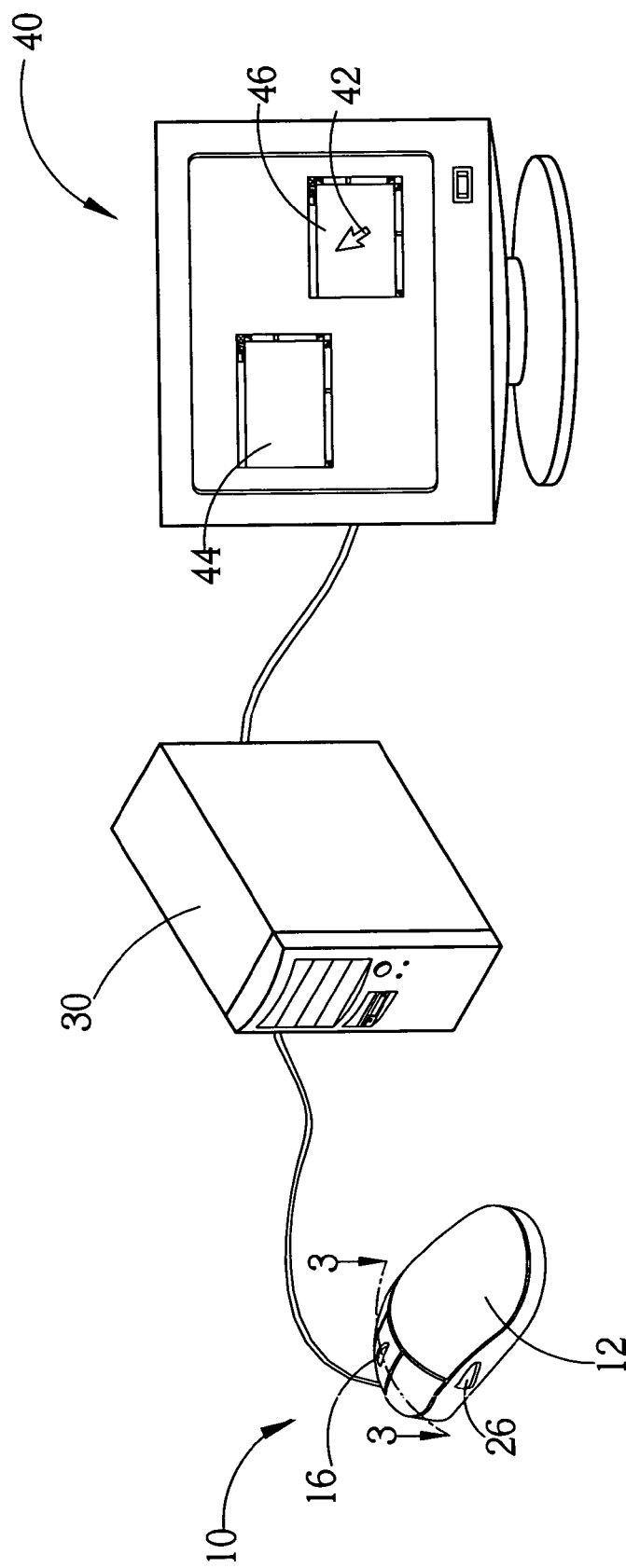
FIG. 1 is a schematic view of a first embodiment pointing device.
Figure 2:
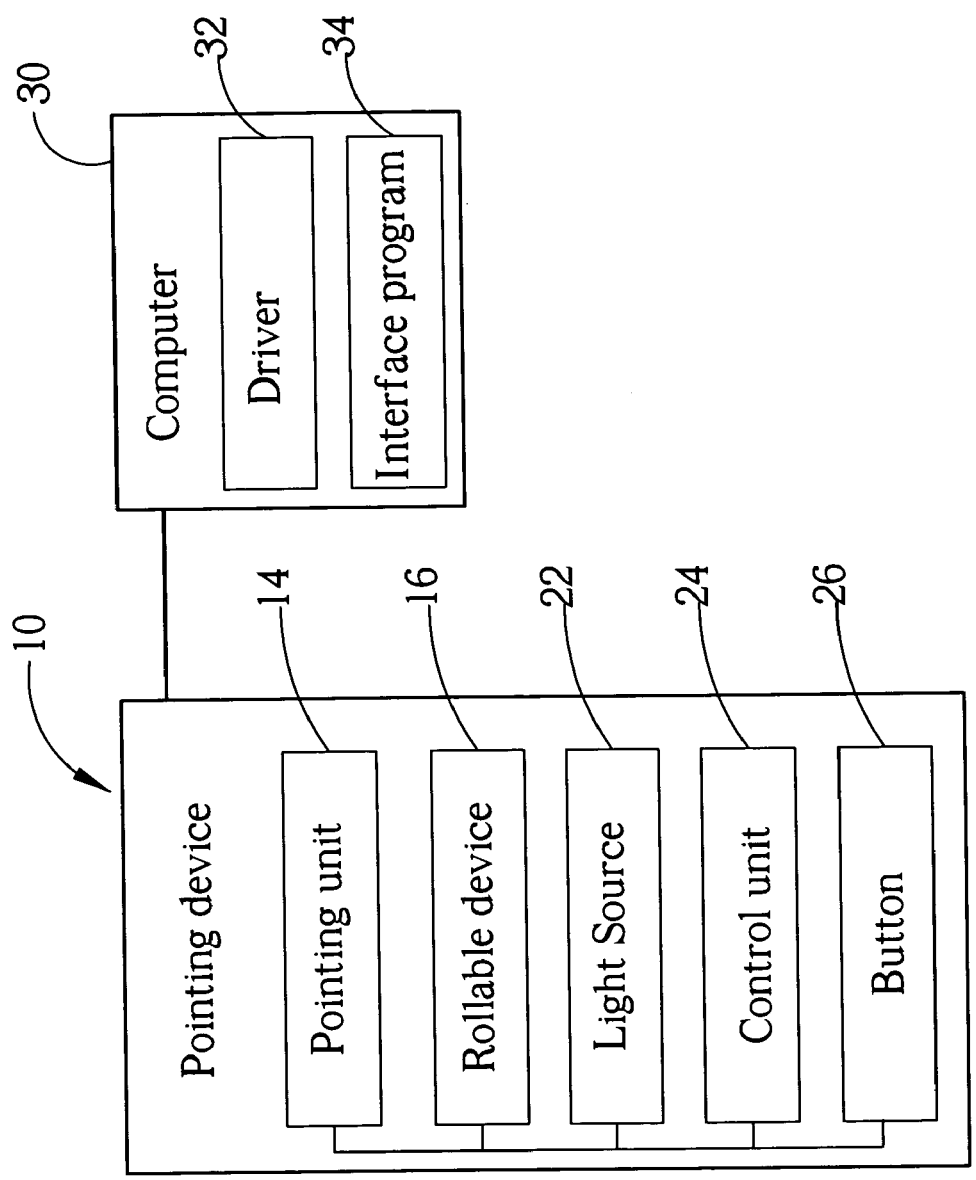
FIG. 2 is a functional block diagram of the pointing device of FIG. 1.
Figure 3:
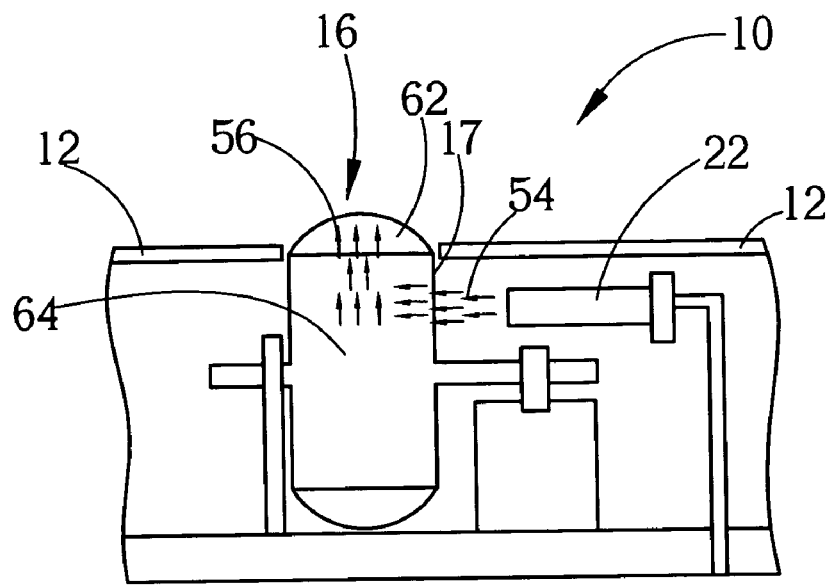
FIG. 3 is a cross-sectional view of the pointing device in FIG. 1.

With reference to FIGS. 1, 2, and 3, a pointing device 10 is electrically connected to a computer 30 to control the movements of a cursor 42 on a display 40 of the computer 30. The pointing device 10 contains a housing 12, a pointing unit 14, a rollable device 16, a light source 22 and a control unit 24.

The pointing unit 14 generates a pointing signal for the computer 30 to control the movement of the cursor 42. The rollable device 16 is a rolling wheel made of a transparent material to generate and transmit a rolling signal to the computer 30 for controlling scrolling of an operating window 44. The light source 22 generates light 54 to illuminate the rollable device 16. The control unit 24 controls the operations of the pointing device 10. In particular, the computer 30 is a desktop computer and the pointing device 10 is a mouse.

As shown in FIG. 2, the computer 30 contains a driver 32 to detect the current state of the computer 30, and an interface program that allows the user to set the illumination mode of the rollable device 16. When the computer state changes, the driver 32 will detect the computer state and cause the computer 30 to send a corresponding state signal to the pointing device 10. The control unit 24 will follow the state signal to control the light source 22 to emit light, or to flash in a particular manner. Illuminated by the light source 22, the rollable device 16 will present different lighting modes (steady light or flashing light). The user can then learn the computer state according to the different illumination modes of the rollable device 16.

Besides a single transparent device, the rollable device 16 can be a rolling wheel made of a ring 62 and a roller 64. The ring 62 is mounted on the outer circumference of the roller 64, surrounding the roller 64. The user can roll the rollable device 16 through the contact of the ring 62 with the roller 64. The light source 22 is installed on one side 17 of the rollable device 16. The ring 62 is made of a transparent material. The roller can reflect light 54 to the ring 62. When the light source 22 illuminates the roller 64, the reflective light 56 will illuminate the rollable device 16.

Figure 4:
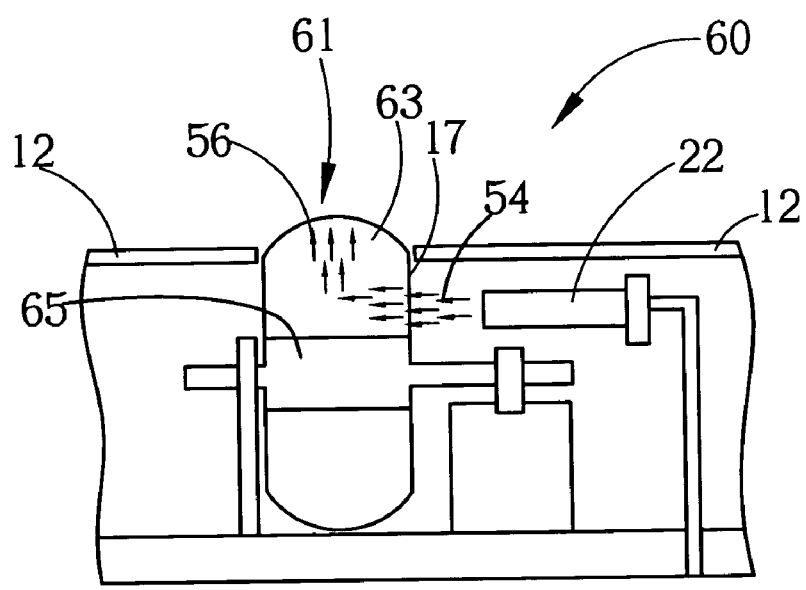
FIG. 4 is a schematic view of a second embodiment pointing device.

With reference to FIG. 4, the rollable device 16 is a rolling wheel made of a ring 63 and a roller 65. The difference between the pointing device 60 and the pointing device 10 is in their respective structures. The light source 22 directly illuminates the ring 63 to illuminate the rollable device 61.

Figure 5:
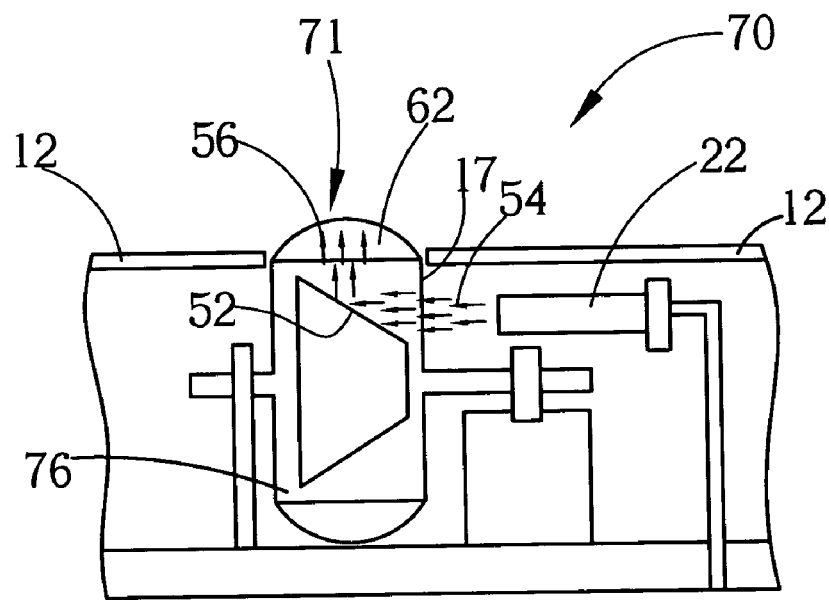
FIG. 5 is a schematic view of a third embodiment pointing device.

With reference to FIG. 5, the light source 22 is installed on one side 17 of a rollable device 71. The inner side of the rollable device 71 further contains a reflecting surface 52 to reflect the light 54 generated by the light source 22, forming reflected light 56. The reflected light 56 will pass through the rollable device 71 so that the user can learnt the current computer state.

Figure 6:
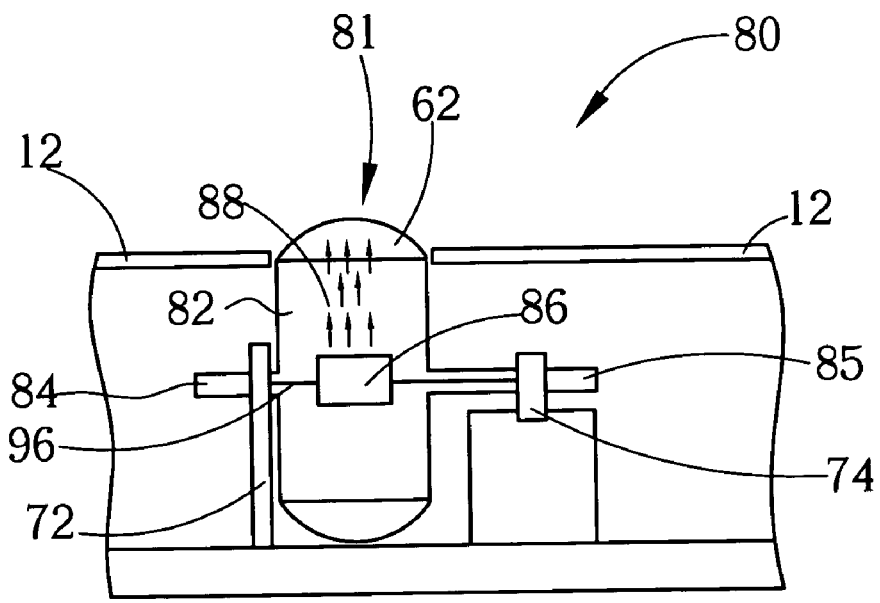
FIG. 6 is a schematic view of a fourth embodiment pointing device.
Figure 7:
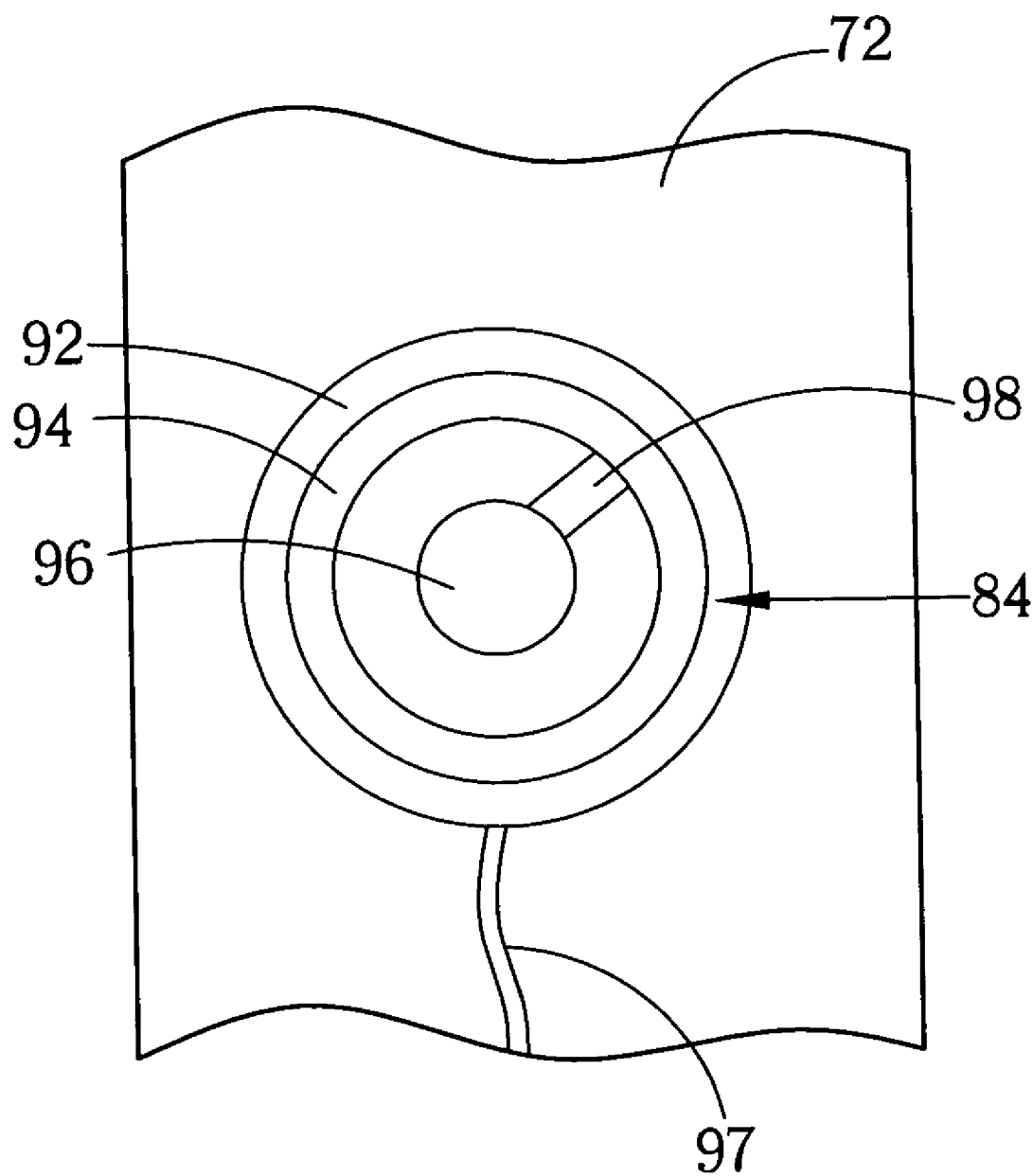
FIG. 7 is a cross-sectional view of a first rolling axis center and a first supporting device of the fourth embodiment pointing device in FIG. 6.

With reference to FIGS. 6 and 7, in addition to one side 17 of the rollable device (as in FIGS. 3 through 5), a light source 86 can be installed inside a roller 82 of a rollable device 81. The ends of the roller 82 are supported by a first supporting device 72 and a second supporting device 74. Each of the contact points of the roller 82 and the first supporting device 72 and the second supporting device 74 has an electrical conduction device 92 to provide the light source 86 power when the rollable device 81 rotates. Light 88 emitted from the light source 86 will go out from the top of the rollable device 81, illuminating the rollable device 81. As shown in FIG. 7, the electrical conduction device 92 is fixed within the first supporting device 72 and electrically connected to a first wire 97. A first axis center 84 of the roller 82 contains an electrical conducting ring 94 that is in sliding contact with the electrical conduction device 92 in the first supporting device 72. The electrical conducting ring 94 is electrically connected to an electrode wire 96 of the light source 86 through a second wire 98. The contact point of a second axis center 85 of the roller 82 and the second supporting device 74 also has the above-mentioned electrical conduction structure. The first wire 97 is electrically connected to electrodes of a power supply so that the electrical conduction device 92 can provide power for the light source 86. The light source can then emit light as the rollable device 81 rotates.

As shown in FIGS. 1 through 3, when the computer 30 is in a particular state, such as having received an e-mail message from a network, operations that are yet to be processed, e-mail messages that are unread, or that the computer operating system allows the user to perform an action (e.g., the operating window 44 or the window 46 pointed to by the cursor of the computer 30 supports a scrolling navigation function), etc., the driver 32 can detect the current computer state and send corresponding state signals to the pointing device 10. The control unit 24 will control the light source 22 to emit light or flash light according to the state signals received. Due to the illumination from the light source 22, the rollable device 16 will present different illumination modes, from which the user can learn the current computer state.

The interface program 34 allows changes to illumination mode settings of the rollable device 16 according to the user's preference. When the user is tired of a specific illumination mode setting, he or she can modify the settings through the interface program 34. After finishing modification to the settings, the driver 32 will cause the computer 30 to send out corresponding state signals to the pointing device 10 accordingly so that the illumination modes of the rollable device 16 will change according to the user's setting.

The light source 22 of the pointing device 10 can be a monochromatic or multi-color light emitting diode (LED). The control unit 24 controls the LED according to different state signals transmitted from the computer 30 so that the LED will emit light in different ways. Accordingly, through the different illumination methods of the LED, the rollable device 16 can present different light modes for the user to learn the current computer state. Moreover, the light source 22 can be composed of multiple LEDs, which can emit monochromatic light or several different colors of light. The illumination modes can be OFF, ON or FLASH so as to display several computer states.

In addition to a rolling wheel, the rollable device 16 can be a trackball, so long as the rollable device 16 can display the message transmitted from the computer 30 by way of illumination.

Figure 8:
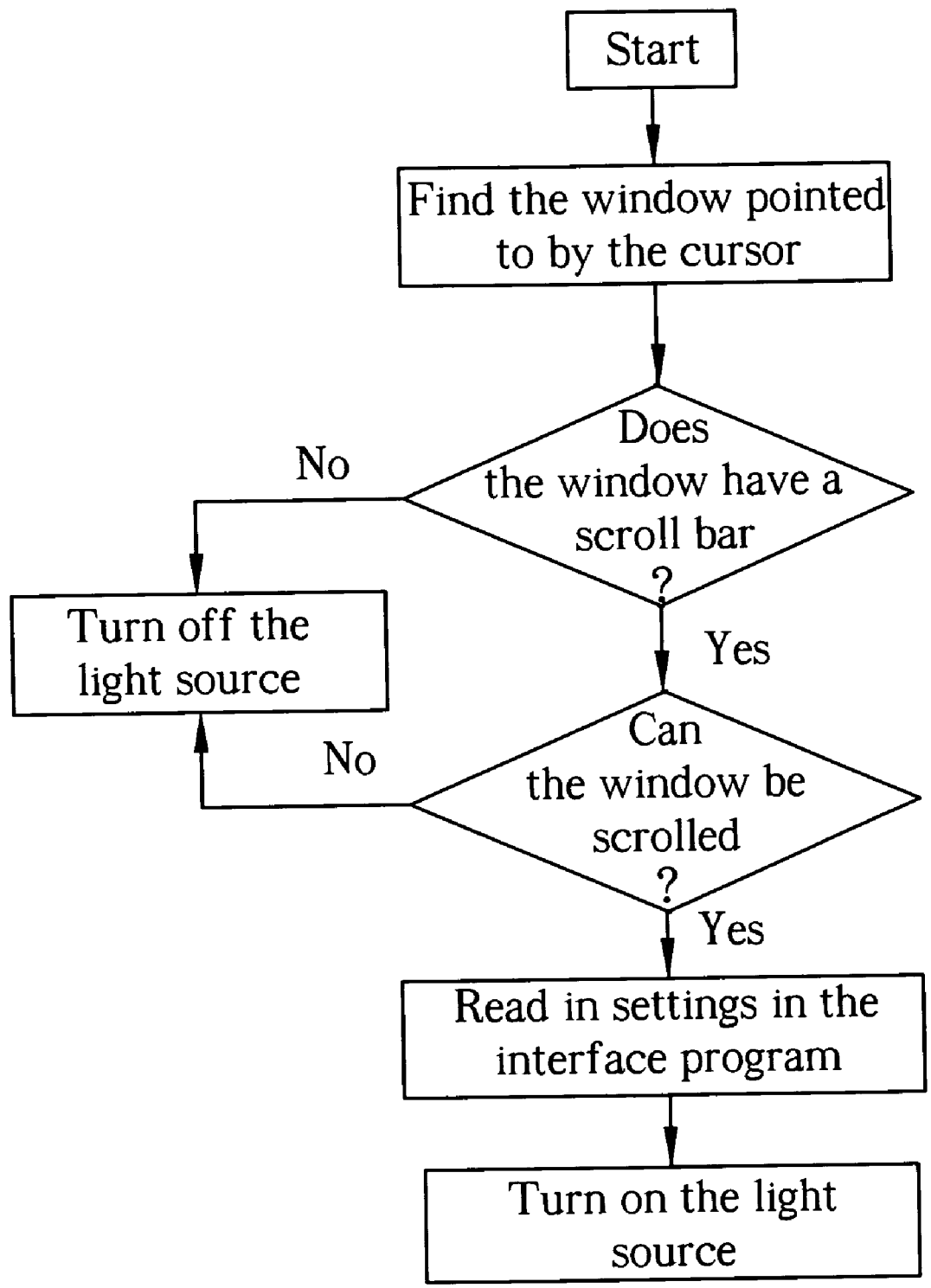
FIG. 8 is a flowchart showing how a driver of FIG. 2 detects if the window pointed to by a cursor has a scrolling function.

With reference to FIG. 8, the driver 32 first finds the window 46 pointed to by the cursor, and detects if the window 46 has a scroll bar. If there is no scroll bar, the driver 32 will make the computer 30 transmit a state signal to the pointing device 10. The control unit 24 turns the light source 22 to OFF, ON or FLASH according to the state signal. If there is a scroll bar, the driver 32 will detect if the window 46 can be scrolled. If not, the driver will make the computer 30 transmit a state signal to the pointing device 10 and the control unit 24 again turns the light source 22 to OFF, ON or FLASH according to the state signal. If the window 46 has a scroll bar and can be scrolled, the driver will read in settings in the interface program 34 and make the computer 30 transmit a state signal to the pointing device 10. The control unit 24 then turns the light source 22 to ON, OFF or FLASH according to the state signal.

Figure 9:
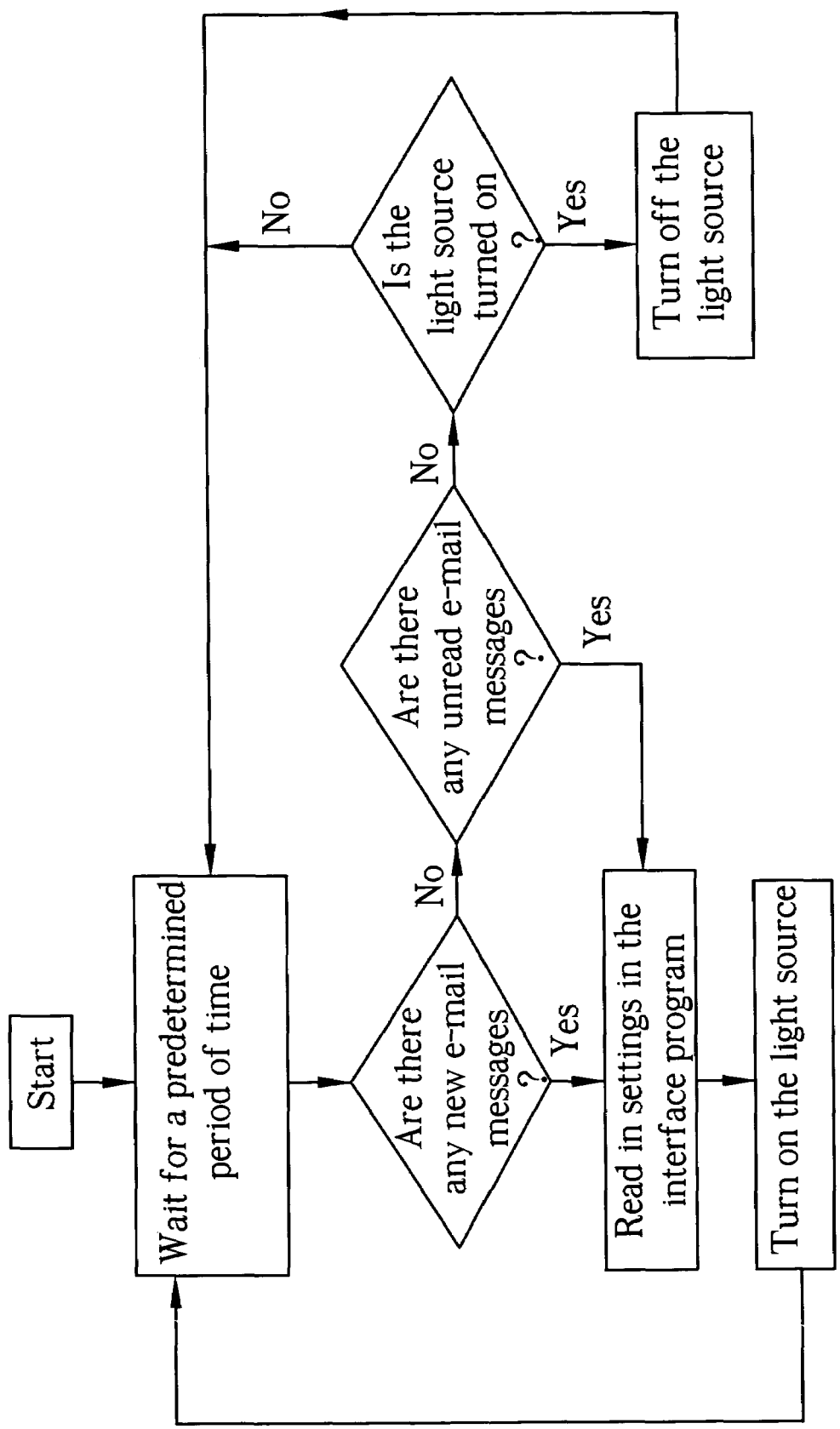
FIG. 9 is a flowchart showing how a driver of FIG. 2 detects if a new message has not been read.

With reference to FIG. 9, the driver 32 automatically regularly detects if there are any new e-mail messages after a predetermined period of time. The predetermined period of time can be set by the user through the interface program 34. When the driver 32 detects a new e-mail message, the driver 32 reads in settings in the interface program 34 and thereby makes the computer 30 transmit a state signal to the pointing device 10. The driver 32 then sets the light mode of the rollable device 16, such as making the light source 22 flash. If the driver 32 does not detect any new e-mail messages, it will further detect if there are any unread e-mail messages. If so, then the driver 32 reads in the settings in the interface program 34 and thereby makes the computer 30 transmit a state signal to the pointing device 10 to make the rollable device emit light with a specific illumination mode. If the driver 32 detects no new e-mail messages or unread messages, the driver 32 will further detect if the light source 22 is turned on. If the light source 22 is on, then the light source is turned off; if the light source 22 is already off, then no action is taken. Every time the driver 32 finishes the above checking procedure, and after the predetermined period of time, the driver 32 will repeat the checking procedure again. The interface program 34 allows the user to set the e-mail checking time period of the driver 32. The driver 32 then performs the above checking procedure according to the period set by the user and informs the user of the result in terms of different illumination modes.

As shown in FIGS. 1, 2, and 3, the pointing device 10 further contains a button 26. When the rollable device 16 presents different illumination modes according to the state signals transmitted from the computer 30, if the user presses the button 26 in a predetermined way, e.g. quickly pressing the button 26 twice, the light source 22 will be turned off to stop the current illumination mode. When the user presses the button 26 of the pointing device 10, a feedback signal is transmitted to the computer 30. The driver will generate a specific action on the computer 30. For example, when the state signal transmitted from the computer 30 means that the computer 30 receives an e-mail message, the user can press the button 26 in a specific manner to start e-mail software to read unread e-mail messages. The user can also set the function of the button 26 through the interface program 34. The driver 32 will compare the feedback signal with the user's settings for the button 26 and thereby control the operations of the computer 30. The rollable device 16 can be directly installed on the button 26 so that the button 26 and the rollable device 16 are coupled together (for example, the button 26 can be the middle key on the mouse in FIG. 1). Hence, when the user presses the rollable device 16, the button 26 will be triggered, making the operation much easier.

In comparison with conventional pointing devices, the disclosed pointing device 10 uses the illumination modes of the rollable device 16 to represent the current state of the computer 30. The user can readily learn of the state of the computer from the illumination mode of the rollable device 16 and control computer operations through the button 26 on the pointing device 10.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing device electrically connected to a computer for controlling movements of a cursor on a display device of the computer, the pointing device comprising:
   a housing;
   a pointing unit installed inside the housing for generating pointing signals to control movements of the cursor;
   a rollable device adapted to control scrolling of a window shown on the display device when rotated by a user;
   a light source for illuminating the rollable device; and
   a control unit for controlling the pointing device;
   wherein when the computer transmits a state signal to the pointing device, the control unit controls the light source to determine an illumination mode of the rollable device according to the state signal.

2. The pointing device of claim 1 wherein the rollable device comprises a transparent material.

3. The pointing device of claim 2 wherein the rollable device is a rolling wheel.

4. The pointing device of claim 3 wherein the rolling wheel comprises a roller and a ring, the ring surrounding an outer circumference of the roller and adapted to enable a user to roll the rolling wheel while contacting the ring, the ring being made of a transparent material to allow the light provided by the light source to pass through the ring.

5. The pointing device of claim 4 wherein the roller comprises a reflecting surface for reflecting the light provided by the light source to enhance the brightness of the rolling wheel.

6. The pointing device of claim 3 wherein the rolling wheel is made of a transparent material to allow the light provided by the light source to pass through the rolling wheel.

7. The pointing device of claim 3 wherein the light source is positioned inside the rolling wheel, and the pointing device further comprises a support and an electrical conduction device, the support supporting the rolling wheel, the electrical conduction device positioned between the support and the rolling wheel to supply power to the light source.

8. The pointing device of claim 1 wherein the rollable device is a trackball.

9. The pointing device of claim 1 wherein the light source is positioned adjacent to the rollable device.

10. The pointing device of claim 1 wherein the light source comprises at least one light-emitting diode.

11. The pointing device of claim 1 wherein the computer further comprises a driver for detecting a state of the computer and transmitting a corresponding state signal to the pointing device.

12. The pointing device of claim 11 wherein the computer further comprises a user interface program for establishing an illumination setting for the illumination mode of the rollable device, the driver transmitting a corresponding state signal to the pointing device according to the illumination setting.

13. The pointing device of claim 11 wherein the driver detects if an operating window of the computer supports a scrolling navigation function, and then transmitting a corresponding state signal to the pointing device.

14. The pointing device of claim 11 wherein the driver detects if a window in which the cursor is located supports a scrolling navigation function, and then transmits a corresponding state signal to the pointing device.

15. The pointing device of claim 11 wherein the driver detects if the computer has received new or unread e-mail, and then transmits a corresponding state signal to the pointing device.

16. The pointing device of claim 11 wherein the driver detects if the computer has received new or unread e-mail during a predetermined period, and then transmits a corresponding state signal to the pointing device.

17. The pointing device of claim 1 further comprising at least one button; wherein pressing of the button in a predetermined manner when the rollable device is illuminated causes the control unit to transmit a feedback signal to the computer.

18. The pointing device of claim 17 wherein the computer further comprises a driver, with the driver controlling the computer according to the feedback signal.

19. The pointing device of claim 18 wherein the computer further comprises a user interface program for setting functions of the button, the driver controlling the computer according to both the feedback signal and set button functions.

20. The pointing device of claim 17 wherein when the rollable device is pressed downwards, the button becomes activated.

21. The pointing device of claim 18 wherein when the computer receives new or unread e-mail followed by a pressing of the button in a predetermined manner, the driver runs an e-mail program to open the new or unread e-mail.

* * * * *